(12) United States Patent
Li et al.

(10) Patent No.: US 9,219,801 B2
(45) Date of Patent: Dec. 22, 2015

(54) IMPLEMENTING A PROTOCOL ADAPTATION LAYER OVER AN INTERNET PROTOCOL

(75) Inventors: Guoqing Li, Portland, OR (US); Carlos Cordeiro, Portland, OR (US); Bahareh Sadeghi, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 33 days.

(21) Appl. No.: 13/995,650

(22) PCT Filed: Dec. 22, 2011

(86) PCT No.: PCT/US2011/066885
§ 371 (c)(1),
(2), (4) Date: Apr. 11, 2014

(87) PCT Pub. No.: WO2013/095517
PCT Pub. Date: Jun. 27, 2013

(65) Prior Publication Data
US 2014/0219291 A1    Aug. 7, 2014

(51) Int. Cl.
*H04L 29/06*    (2006.01)
*H04W 80/04*   (2009.01)
*H04W 80/06*   (2009.01)

(52) U.S. Cl.
CPC .............. *H04L 69/08* (2013.01); *H04L 69/168* (2013.01); *H04L 69/169* (2013.01); *H04W 80/04* (2013.01); *H04W 80/06* (2013.01)

(58) Field of Classification Search
None
See application file for complete search history.

(56) References Cited

U.S. PATENT DOCUMENTS

| 2006/0045117 A1 | 3/2006 | Qi et al. |
| 2010/0130138 A1 | 5/2010 | Nandagopalan et al. |
| 2011/0097999 A1 | 4/2011 | Hansen et al. |

FOREIGN PATENT DOCUMENTS

WO    2013/095517 A1    6/2013

OTHER PUBLICATIONS

WiGig White Paper Defining the Future of Multi-Gigabit Wireless communication, Jul. 2010.*

(Continued)

*Primary Examiner* — Thai Nguyen
(74) *Attorney, Agent, or Firm* — Ellis B. Ramirez; PRASS LLP

(57) ABSTRACT

A system and method are provided that allow WiGig protocol adaptation layers (PALs) to operate differently from the proposed WiGig standard on top of an Internet protocol (IP) layer in order to enhance routing options for communication of the data traffic between a transmitting (source) device and a receiving (sink) device. A layering architecture is provided that allows WiGig PALs, such as WDE, to operate on top of an IP layer. A signaling mechanism is also provided that allows a negotiation, or at least an indication, of the underlying layering structure for specific data communications. Recognizing that the next generation wireless display requires technology such as WiGig WDE to support the driving demand for a cable replacement user experience and richer wireless display use cases, this PAL over IP architecture optimizes alignment of the WiGig data communication technology with other data communication technologies.

14 Claims, 4 Drawing Sheets

(56) References Cited

OTHER PUBLICATIONS

International Search Report and Written Opinion received for PCT Patent Application No. PCT/US2011/066885, mailed on Aug. 22, 2012, 9 pages.

International Preliminary Report on Patentability and Written Opinion received for PCT Patent Application No. PCT/US2011/066885, mailed on Jul. 3, 2014, 6 pages.

* cited by examiner

IMPLEMENTING A PROTOCOL ADAPTATION LAYER OVER AN INTERNET PROTOCOL

BACKGROUND

1. Field of the Disclosed Embodiments

This disclosure relates to systems and methods for implementing a WiGig Protocol Adaptation Layer (PAL) over an Internet Protocol (IP).

2. Related Art

The next step in wireless communication is nearing. A first generation of mmWave, such as 60 GHz, wireless communication systems is in the process of being standardized as, for example, the proposed IEEE 802.11ad/WiGig standard. A broad spectrum of products that support mmWave wireless communication are being developed and manufactured.

The Wireless Gigabit Alliance (WiGig) has defined the specification for the 60 GHz MAC and PHY layers. The WiGig MAC/PHY specification enables data rates up to 7 Gbps, which is significantly faster than any data rate available in Wi-Fi networks based on current standards. WiGig systems operate in the 60 GHz frequency band, and have a broader spectrum available than the 2.4 GHz and 5 GHz bands used by existing Wi-Fi communications. This allows wider bandwidths that support faster transmission speeds.

WiGig has defined multiple protocol adaptation layers (PALs) directly on top of the 60 GHz MAC and PHY layers. This is not a wholly new concept in that other standards, such as Wi-Fi, define similar or different protocol adaptation layers that facilitate specific applications over different MAC/PHY layers. FIG. 1 illustrates an example of the currently proposed WiGig layering model. As shown in FIG. 1, multiple PALs 120-150 are specified directly on top of the WiGig 60 GHz MAC layer 110 and the WiGig 60 GHz PHY layer 100. These separate PALs 120-150 provide for optimal support of different types of applications according to the WiGig proposed standards for 60 GHz wireless communication. For example, the recently-developed WiGig Display Extension (WDE) PAL 120 supports wireless transmission of audio/video data via multiple interfaces and offers key audio/video applications, such as transmission of compressed or uncompressed video from a computer or digital camera to an HDTV, a monitor or a projector. The WiGig Serial Extension (WSE) PAL 130 defines high-performance wireless implementations of widely-used computer interfaces over 60 GHz enabling the multi-gigabit wireless connectivity between devices for, for example, USB type data traffic. The WiGig Bus Extension (WBE) PAL 140 supports Peripheral Component Interconnect Express (PCIe) data traffic. A separate Secure Digital Input/Output (SDIO) PAL 150 supports SDIO traffic. Additionally, the WiGig architecture and standards leave open the possibility that other PALs may be specified to support other traffic types as may be defined by WiGig in the future.

In the currently proposed WiGig layering model, as shown in FIG. 1, the PAL layers operate directly on top of the MAC layer, providing the maximum protocol efficiency and minimum overhead.

Transmission Control Protocol (TCP) or User Diagram Protocol (UDP) and Internet Protocol (IP), commonly referred to as TCP/IP or UDP/IP, provide a well-known suite of communications protocols used for communicating over the Internet and over other networks. TCP/IP or UDP/IP methods and protocols are generally organized into a standard hierarchy of abstraction layers, including a link layer, an Internet layer, a transport layer, and an application layer. Those of skill in the art recognize that each layer has functionality to solve certain issues that are specified and limited in scope according to the layer. The hierarchical structure facilitates communications by limiting separate functions to separate layers. The link layer contains communication technologies for the local network to which the host is connected directly by hardware components. The Internet layer facilitates the interconnection of local networks generally establishing the Internet. Host-to-host communication tasks are handled in the transport layer, which provides a general application-agnostic framework to transmit data between hosts using either TCP or User Datagram Protocol (UDP). A highest-level application layer contains protocols that are each specifically defined for applications that facilitate individual data communications.

As is indicated briefly above, transport layers are known generally to comprise one of two overarching protocols, TCP and UDP. Those of skill in the art recognize that there may be specific reasons for choosing one over the other based on the different characteristics of these protocols.

TCP is the more commonly known and used of these protocols for Internet communications generally because TCP offers acknowledgement of receipt of data packets in a specified order, thereby allowing for error correction. When TCP is used, the content of the data packet provides an ability to guarantee delivery of the data based on flow control. TCP flow control may determine that certain data has not been received, or has been received out of order, and may need to be resent. In such instances, the flow of data may be interrupted until the system determines that previously undelivered packets are successfully received.

Conversely, UDP is rarely used to send data that is considered to be important and in which the delivery of the data must be guaranteed. UDP is often used for streaming audio and video because, by doing away with the need for acknowledgement and verification, like TCP flow control and error correction, UDP is faster. This speed is the principal benefit of UDP in instances where imprecision of receipt of the data may be acceptable.

SUMMARY OF THE DISCLOSED EMBODIMENTS

It would be advantageous to define a manner by which to allow the WiGig PALs to operate differently from the proposed WiGig standard on top of an IP layer in order to enhance routing options for communication of the WiGig data communication traffic.

In various exemplary embodiments, the systems and methods according to this disclosure may provide a layering architecture that allows at least one WiGig PAL, such as WDE, to operate on top of an IP layer instead of directly on a WiGig MAC layer.

In various exemplary embodiments, the systems and methods according to this disclosure may provide a signaling mechanism that allows a negotiation, or at least an indication, of an underlying layering structure that may provide for a PAL over IP communication scheme.

In various exemplary embodiments, the systems and methods according to this disclosure, recognizing that the next generation wireless display requires technology such as WiGig WDE to support the driving demand for a cable replacement user experience and much richer wireless display use cases, may provide a PAL over IP architecture that may optimize alignment of WiGig with other communication technologies, both wireless and wired.

In various exemplary embodiments, the systems and methods according to this disclosure may allow WiGig products to reuse Wi-Fi display components to a maximum extent possible when upgrading to WiGig display for advanced features through the use of known IP methods and standards.

In various exemplary embodiments, the inclusion of an IP layer may transform the WiGig communications into radio-agnostic communications and may expand WiGig point-to-point communication to a multiple hop configuration once the data is converted through IP.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing for implementing a PAL over IP communication scheme will be described, in detail, with reference to the following drawings, in which.

DETAILED DESCRIPTION OF THE DISCLOSED EMBODIMENTS

The systems and methods for implementing a PAL over IP communication scheme will generally refer to this specific utility for those systems and methods. Exemplary embodiments described and depicted in this disclosure should not be interpreted as being specifically limited to any particular configuration in individual layers as discussed below, or directed to any particular intended use beyond broadly facilitating WiGig data communication traffic combining advantages of known and planned protocols and layer structures. Although this disclosure will describe at least one specific example of a combination of a WiGig PAL, i.e., WDE PAL, with an IP structure for clarity and ease of understanding of the disclosed concepts, it must be recognized that the systems and methods according to this disclosure are intended to encompass various combinations of layer components as generally described below.

Specific reference to, for example, any particular wired or wireless communicating device or concept, including specifically cooperating communicating devices at least some of which operate wirelessly in the mmWave, and particularly 60 GHz, region of the RF spectrum, should be understood also as being exemplary only, and not limiting, in any manner, to any particular class of devices or communication links. For example, reference is made throughout this disclosure to the WiGig WDE PAL for illustration purposes. Using other of the WiGig PALS over an IP structure is contemplated. The systems and methods according to this disclosure will be described as being particularly adaptable to the above-described function, but should not be considered as being limited to only this function.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and method steps, and combinations of those elements and method steps, as particularly pointed out in the appended claims. A person skilled in the relevant art will recognize that other components and configurations may be used without departing from the spirit and scope of the subject matter of this disclosure.

Various aspects of the disclosed embodiments relate to a system and a method for implementing a PAL over IP communication scheme in order to enhance options for routing of data, as well as a corresponding non-transitory computer-readable medium having recorded on it a program that, when executed by a processor, causes the processor to execute the steps of the method for implementing a PAL over IP communication scheme.

Figure 2:
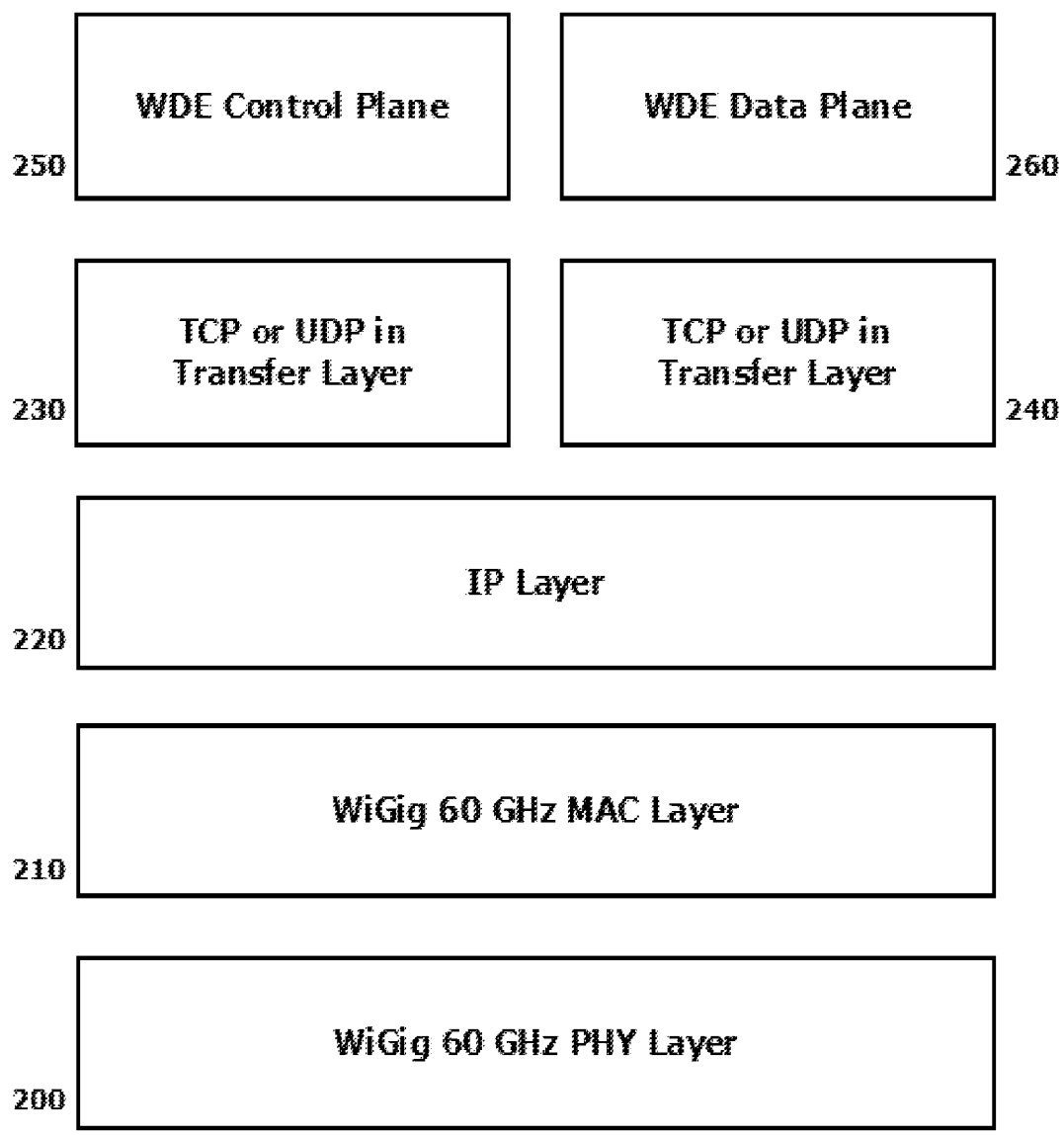
FIG. 2 illustrates an exemplary overview of a PAL over IP communication scheme according to this disclosure.

FIG. 2 illustrates an exemplary overview of a PAL over IP communication scheme according to this disclosure. As shown in FIG. 2, an IP layer 220 and one or more transport layers 230,240 may be placed directly over the WiGig 60 GHz PHY layer 200 and the WiGig 60 GHz MAC layer 210 separating the WiGig PALs from the MAC and PHY layers. Above the IP layer 220 and the transport layers 230,240 then are the application (or PAL) layers. In the exemplary embodiment depicted in FIG. 2, the exemplary WDE PAL is divided into a WDE control plane 250 and a WDE data plane 260.

The layering architecture shown in FIG. 2 may provide significantly varied data communication traffic options. As shown in FIG. 2, for example, WDE data communication traffic can be split into different categories such as a data packet, WDE data plane 260, and a control packet, WDE control plane 250. In this manner, the different portions of the WDE data communication traffic can be addressed through different transport layers 230,240 as may be most appropriate or most advantageous to data transmission and reception.

In accordance with the above, for example, TCP can be used for the WDE control and management traffic, and UDP can be used to transport the WDE data traffic. Selection of either TCP or UDP for the transport layer for particular information may be based on a number of factors including the content of the data. The flexibility afforded by the layer structure shown in FIG. 2 provides a capacity, for example, to transmit higher priority data traffic through TCP based on its increased reliability, and less important information through UDP in order to take optimal advantage of the speed afforded by such a communication path. Alternatively, latency-insensitive traffic may be communicated through TCP while latency-sensitive traffic may be communicated through UDP.

Another option, apart from that shown specifically in the exemplary embodiment depicted in FIG. 2, may allow only WDE control packets to go through the IP layer 220 while the WDE data packets may go over the WiGig 60 GHz MAC layer 210 directly for increased efficiency according to the currently proposed WiGig standard.

Based on the availability of the above varied options, before data communication traffic can be exchanged between a transmitting (source) device and a receiving (sink) device, the source device and the sink device must conduct preliminary communications in an attempt to determine an ability of each of the source device and the sink device to support a specific underlying layering structure. This becomes important so that the sink device knows how to handle the received data by, for example, processing the data through IP protocol at the receive side or sending the data directly to the WiGig MAC. It is anticipated that these preliminary communications may include signaling that may be undertaken via WiGig device profiling or via other means.

In instances where the signaling is undertaken through WiGig device profiling, different device profiles may be specified by PAL certification and interoperability body. A specific first WDE profile may indicate that, for example, a WDE control packet may be transmitted over TCP/IP as supported at each of the source device and the sink device with WDE data packets being transmitted directly via the WiGig 60 GHz MAC layer. Alternatively, and by way of further example only, a specific second WDE profile may indicate that all WDE packets are communicated over UDP/IP. These are only a few of the many combinations of profiles that may be employed.

Separately, and in instances where a source device and a sink device are in communication with each other via a wireless network, profiling information may be negotiated through other conventional technologies. These other conventional technologies may include, for example one or more of the following: Domain Name System (DNS) service discovery; Bonjour for service discovery; Wi-Fi Direct or MAC layer device/service discovery processes; and other like means that may facilitate negotiating profiling information between the source and the sink device. Generally, the technologies would need to include signaling that would allow an indication and negotiation of the upper layer layering, which may include whether IP is or is not used, when extended to include what are considered Layer 2 negotiations.

In instances where source and sink devices may support multiple layering structures, a specific layering structure that defines a manner by which the data communication traffic is categorized and whether, for example, TCP or UDP it to be employed on each communication data traffic category may be undertaken between the source and the sink device through, for example, PAL, e.g., WDE, session negotiation. This negotiation may, for example, involve initial WDE signaling that may be mandated to go through a fixed layering structure such as, for example, TCP/IP, to indicate the communication data traffic categories and whether TCP or UDP is to be applied to each of the data communication traffic categories and to indicate corresponding data communication port information that may be appropriate, or otherwise, in some manner required, for proper data communication traffic transfer. This negotiation may take place at the beginning of a session and also may be dynamically changed within a session depending on the capabilities of the source and sink devices that are communicating with each other with respect to (1) supported layering structures, and (2) an ability to execute dynamic negotiation internal to a communicating session.

As indicated above, the exemplary references to WDE as shown in FIG. 2 and discussed above are for illustration and context purposes only. Any WiGig PAL that could benefit from the flexibility afforded by the above layered structure should be considered to be part of the above discussion. It should be appreciated, therefore, that the exemplary depiction in FIG. 2 is not intended to be limiting as an only configuration available for the disclosed systems and methods, or for the discussed layer structure. In other words, no specific configuration for, or combination of, the layer structure is to be implied by the depiction in FIG. 2.

Figure 3:
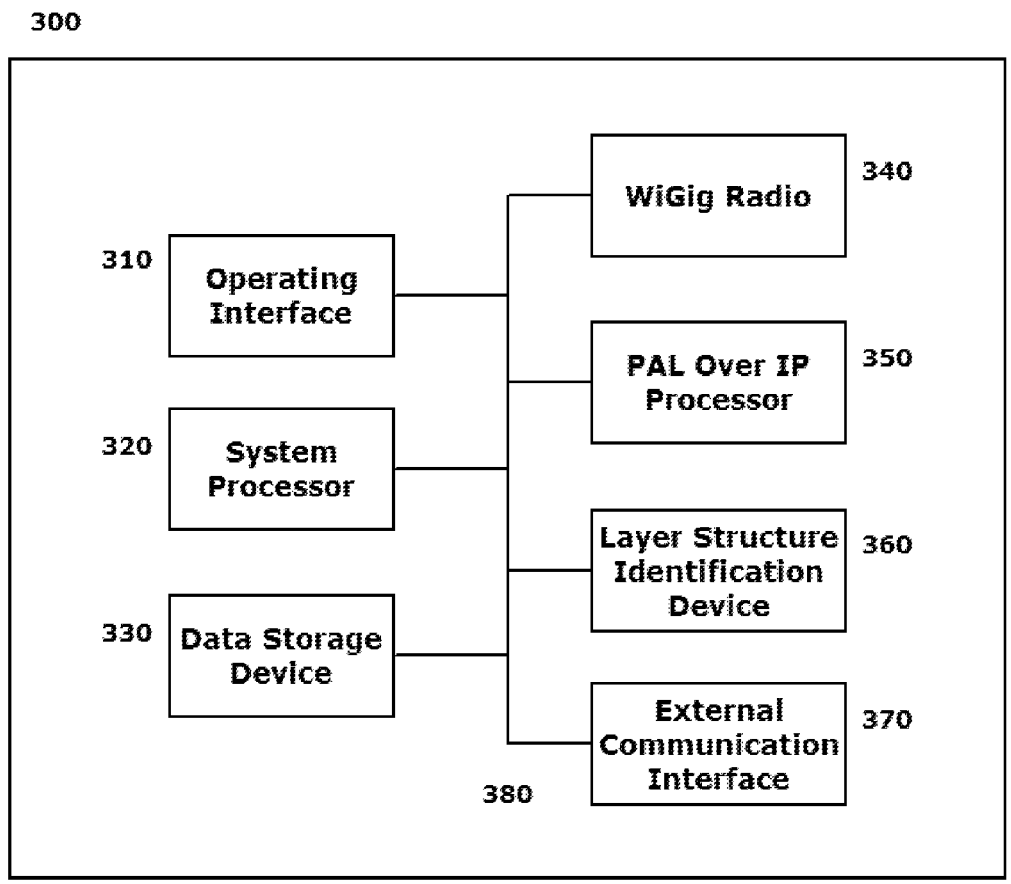
FIG. 3 illustrates a block diagram of an exemplary system for implementing a PAL over IP communication scheme according to this disclosure.

FIG. 3 illustrates a block diagram of an exemplary system 300 for implementing a PAL over IP communication scheme according to this disclosure. The exemplary system 300 may be in either of a transmitter (source) or receiver (sink) side of a data communication link.

The exemplary system 300 may include an operating interface 310 by which the system 300 may be manually operated by a user, or automatically operated by an overarching system within which the system 300 is installed according to instructions that may be input to, and interpreted by, the system 300. The operating interface 310 may perform such simple functions as turning on and off the system 300 at appropriate times, or otherwise performing higher level functions such as, for example, determining whether to execute a PAL over IP communication scheme. The system 300 may make such a determination according to a type of information to be transmitted or an availability of a layering structure that is supported by a receiver (sink device) with which the system 300 may communicate.

The system 300 may include one or more local processors 320 for individually undertaking determination processes that are carried out by the system 300. The processor(s) 320 may provide input to the system 300 regarding implementing a specific data communication scheme including a PAL over IP communication scheme based on inputs such as those discussed briefly above. The processor(s) 320 may carry out processing and control functions for directing the PAL over IP communication scheme in the system 300. Processor(s) 320 may include at least one conventional processor or microprocessor that interprets and implements instructions to make the determinations appropriate to carrying into effect the PAL over IP scheme discussed in this disclosure.

The system 300 may include one or more data storage devices 330. Such data storage device(s) 330 may be used to limitedly store data or operating programs as may be appropriate for use in the system 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for the processor(s) 320. In these installations, the data storage device(s) 330 may be provided as integral components of the system 300, or otherwise may be provided external to, and in wired or wireless communication with, system 300 such as, for example, in communication with the other components of the system 300 for implementing the PAL over IP communication scheme, as discussed below.

The system 300 may include a WiGig radio 340 to facilitate direct WiGig 60 GHz communication between respective source and sink devices. It should be understood that the inclusion of the IP layer, however, makes the system 300 radio-agnostic. WiGig PALs can thus be made radio independent.

The system 300 may include a PAL over IP processor 350 to establish a specific set of layering structures to include IP as may be available for transmissions from or receptions to the system 300.

The system 300 may include a layer structure identification device 360 in order to identify, or otherwise negotiate, specific layer structures for all communications between a source device and a sink device, or for a specific communication session between the devices, or even for a part of a specific communication session between the devices. These identifications and/or negotiations may be undertaken according to any of the commonly known processes indicated above or may otherwise be undertaken by related processes as may be specified for such identifications and/or negotiations.

The system 300 may include an external communication interface 370 as may be appropriate to input data for transmission from a data source, or to output received data to a data sink for use by a user.

All of the various components of the system 300, as depicted in FIG. 3, may be connected by one or more data/control busses 380. The data/control bus(es) 380 may provide internal wired or wireless communication between the various components of the system 300, whether all of those components are housed integrally as a single unit or are otherwise connected to and in wired or wireless communication with each other.

It should be appreciated that, although depicted in FIG. 3 as an integral unit, the various disclosed elements of the system 300 may be arranged in any combination of sub-systems as individual components or combinations of components, integral to a single unit, or external to, and in communication with the single unit. In other words, no specific configuration as an integral unit or as a support unit, for the system 300 is to be implied by the depiction in FIG. 3. Further, as noted above, certain of the functions described may actually be housed in or carried out by components of an overarching system that the system 300 supports.

The disclosed embodiments may include a method for implementing a PAL over IP communication scheme. The method may include conducting preliminary communications between a source device and a sink device in an attempt to determine an ability of each of the source device and the sink device to support a specific underlying layering structure in support of WiGig communications between the source device and the sink device. The method may include identifying a range of layering structures that are supported by the source and the sink device for WiGig data communication traffic. This becomes important so that the sink device knows how to handle received data by, for example, processing the data through IP protocol at the sink device. The method may determine whether IP is required by either device, or is appropriate for communication between the devices. The method may then negotiate a specific layered structure including a specific PAL over IP layer structure for PAL over IP data communication between the source device and the sink device. The method may then implement the specifically-negotiated PAL over IP layer structure for communication between the devices. The method may then communicate the data between the source and the sink devices according to the specifically-negotiated PAL over IP layer structure, or otherwise where IP is not required or appropriate, until the communication of the data communication traffic is complete.

Figure 4:
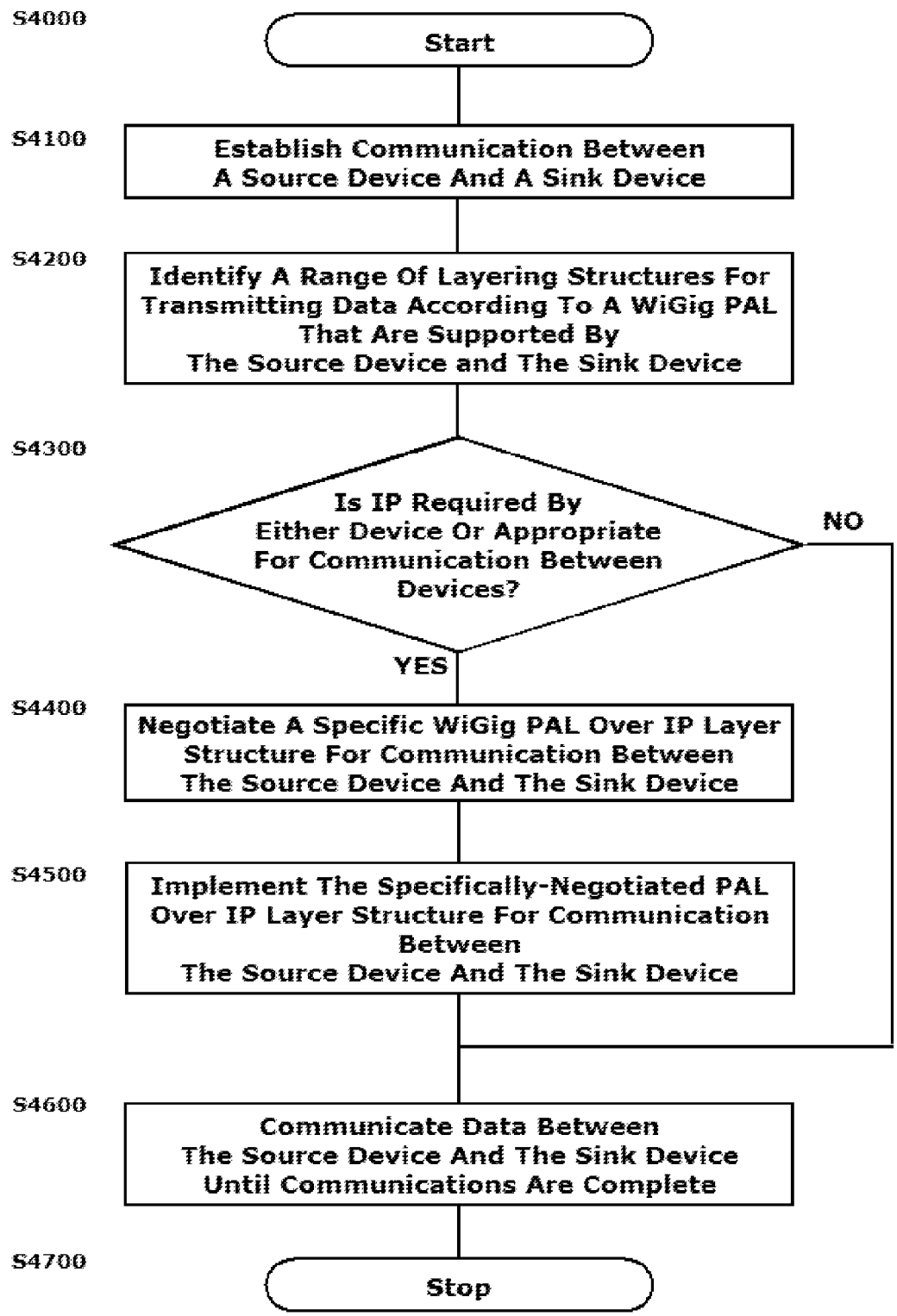
FIG. 4 illustrates a flowchart of an exemplary method for implementing a PAL over IP communication scheme according to this disclosure.

FIG. 4 illustrates a flowchart of an exemplary method for implementing a PAL over IP communication scheme according to this disclosure. As shown in FIG. 4, operation of the method commences at Step S4000 and proceeds to Step S4100.

In Step S4100, preliminary communication may be established between a source device and a sink device. Operation of the method proceeds to Step S4200.

In Step S4200, the source device and the sink device may cooperate to identify a range of data transmission layer structures that may be used to communicate one or more WiGig PALs between the source device and the sink device. Operation of the method proceeds to Step S4300.

Step S4300 is a determination step. In Step S4300, it may be determined whether IP is required by either device, or appropriate for communication between the source device and the sink device.

Figure 1:
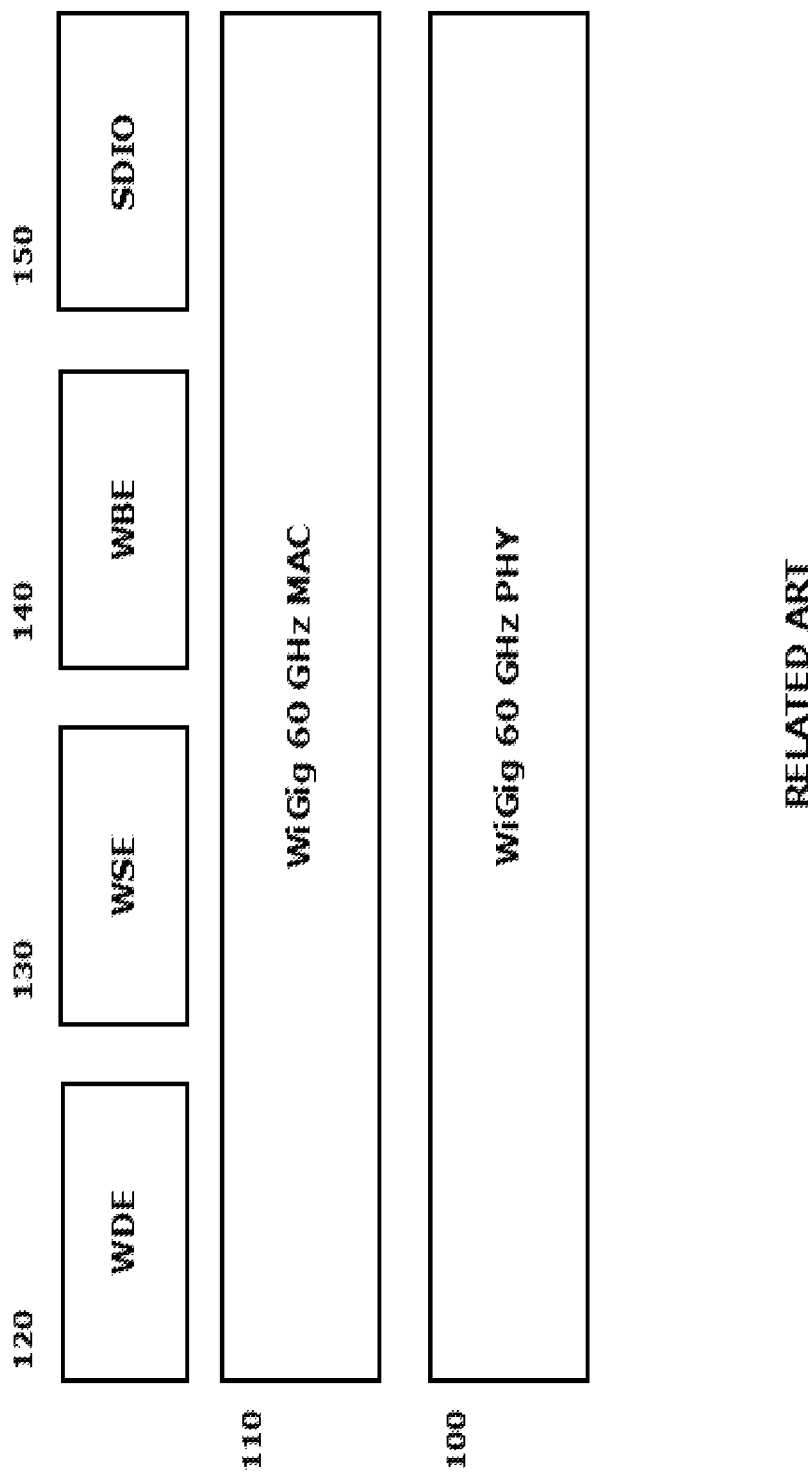
FIG. 1 illustrates the currently proposed layering structure for WiGig 60 GHz communication.

If, in Step S4300, it is determined that IP is neither required nor appropriate for communication between the source device and the sink device, operation of the method proceeds to Step S4600 where WiGig data communications are effected between the source device and the sink device using a data communication layering structure that does not include IP, such as, for example, via the WiGig 60 GHz specification shown in FIG. 1.

If, in Step S4300, it is determined that IP is either required or appropriate for communication between the source device and the sink device, operation of the method proceeds to Step S4400.

In Step S4400, a specific PAL over IP layer structure may be negotiated for communication between the source device and the sink device according to one or more of the various known negotiating processes discussed above. Operation of the method proceeds to Step S4500.

In Step S4500, the specifically-negotiated PAL over IP layer structure may be implemented for all communications, or for session or partial session negotiations, between the source device and the sink device. Operation of the method proceeds to Step S4600.

In Step S4600, communication between the source device and the sink device are undertaken according to the specifically-negotiated PAL over IP layer structure until the communications are complete. Operation of the method proceeds to Step S4700, where operation of the method ceases.

The disclosed embodiments may include a non-transitory computer-readable medium storing instructions which, when executed by a processor, may cause the processor to execute the steps of the method as outlined, and as described in detail, above.

The above-described exemplary systems and methods reference certain conventional or otherwise known communicating components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described.

Those skilled in the art will appreciate that other embodiments separate from those specifically disclosed may be practiced using the concepts described above and such embodiments should reasonably be considered to be encompassed in the above discussion.

Embodiments may also be practiced in distributed network computing environments where tasks are performed by local and remote processing devices, generally as outlined above, that are linked to each other by hardwired links, wireless links, or a combination of both through the computing network.

Embodiments within the scope of the present disclosure may include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor to be executed by the processor when the processor is caused to communicate in a network environment.

The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

We claim:

1. A method for implementing a protocol adaptation layer (PAL) over Internet protocol (IP) communication scheme, comprising:
   establishing communication between a source device and a sink device;
   determining at the source device whether each of the source device and the sink device support communication of PAL data traffic;
   placing at the source device an IP layer and a transport layer between MAC and PAL layers based on the determining to establish a PAL over IP communication scheme;
   completing data communication between the source device and the sink device according to the established PAL over IP communication scheme, wherein a first portion of the data communication being supported by TCP and a second portion of the data communication being supported by UDP; and
   assigning the data communication respectively to the first portion and the second portion according to at least one of a relative priority, a relative importance and a relative latency-sensitivity of the first portion and the second portion of the data communication, wherein the PAL data traffic being WiGig 60 GHz PAL data traffic.

2. The method of claim 1, the WiGig 60 GHz PAL data traffic being made available for use in non-WiGig 60 GHz devices by the PAL over IP communication scheme.

3. The method of claim 1, the data communication between the source device and the sink device being converted from point-to-point communication to multiple hop communication by the PAL over IP communication scheme.

4. The method of claim 1, the determining whether each of the source device and the sink device support the communication of the PAL data traffic comprises identifying one or more data layer structures supported by each of the source device and the sink device.

5. The method of claim 4, further comprising negotiating between the one or more identified data layer structures to establish the PAL over IP communication scheme between the source device and the sink device that is used for at least a portion of the data communication between the source device and the sink device.

6. The method of claim 5, the transport layer including at least one of a Transmission Control Protocol (TCP) and a User Datagram Protocol (UDP).

7. The method of claim 6, further comprising determining which of TCP or UDP is used to support the data communication.

8. The method of claim 6, a first portion of the data communication being supported by at least one of the TCP and the UDP, and a second portion of the data communication being supported directly by the MAC layer.

9. A system for implementing a PAL over IP communication scheme, comprising:
   a source device that communicates according to at least a WiGig 60 GHz layered data structure including at least one WiGig PAL; and
   a sink device including at least one other layered data structure, the sink device communicating with the source device and, based on that communicating,
   determining that the sink device does not support communication of WiGig 60 GHz PAL data traffic; and
   employing the WiGig 60 GHz layered data structure in the source device in which an IP layer and a transport layer are inserted between MAC and PAL layers based on the determining to establish a PAL over IP communication scheme to complete data communication between the source device and the sink device according to the established PAL over IP communication scheme;
   wherein the transport layer including at least one of TCP and UDP;
   wherein a processor in at least one of the source device and the sink device being programmed to determine which of TCP or UDP is used to support the data communication;
   wherein a processor in at least one of the source device and the sink device being programmed to designate a first portion of the data communication to TCP support and a second portion of the data communication to UDP support.

10. The system of claim 9, the WiGig 60 GHz PAL data traffic being made available for use in non-WiGig 60 GHz devices by the PAL over IP communication scheme.

11. The system of claim 9, the data communication between the source device and the sink device being converted from point-to-point communication to multiple hop communication by the PAL over IP communication scheme.

12. The system of claim 9, each of the source device and the sink device supporting a plurality of data layer structures.

13. The system of claim 12, a processor in at least one of the source device and the sink device being programmed to negotiate between the plurality of data layer structures supported by each of the source device and the sink device to establish the PAL over IP communication scheme between the source device and the sink device that is used for at least a portion of the data communication between the source device and the sink device.

14. A non-transitory computer-readable medium storing computer-readable instructions which, when executed by a processor, cause the processor at a source device to execute a method for implementing a PAL over IP communication scheme, comprising:
   establishing communication between the source device and a sink device;
   determining whether each of the source device and the sink device support communication of WiGig PAL data traffic;

placing an IP layer and a transport layer between WiGig 60 GHz MAC and PAL layers based on the determining to establish a PAL over IP communication scheme; and completing data communication between the source device and the sink device according to the established PAL over IP communication scheme, wherein a first portion of the data communication being supported by TCP and a second portion of the data communication being supported by UDP; and assigning the data communication respectively to the first portion and the second portion according to at least one of a relative priority, a relative importance and a relative latency-sensitivity of the first portion and the second portion of the data communication.

\* \* \* \* \*